March 12, 1935.  O. N. WISWELL  1,994,158
DEVICE FOR OPENING SEALED CONTAINERS
Filed June 28, 1933    2 Sheets-Sheet 2
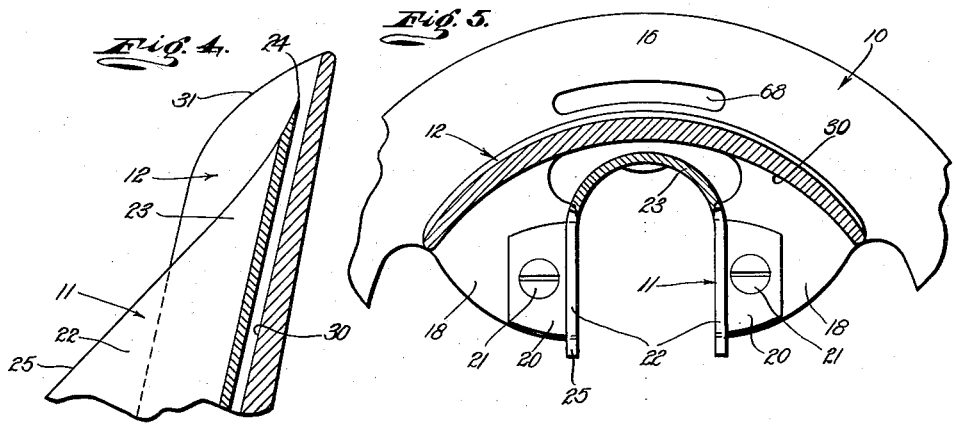
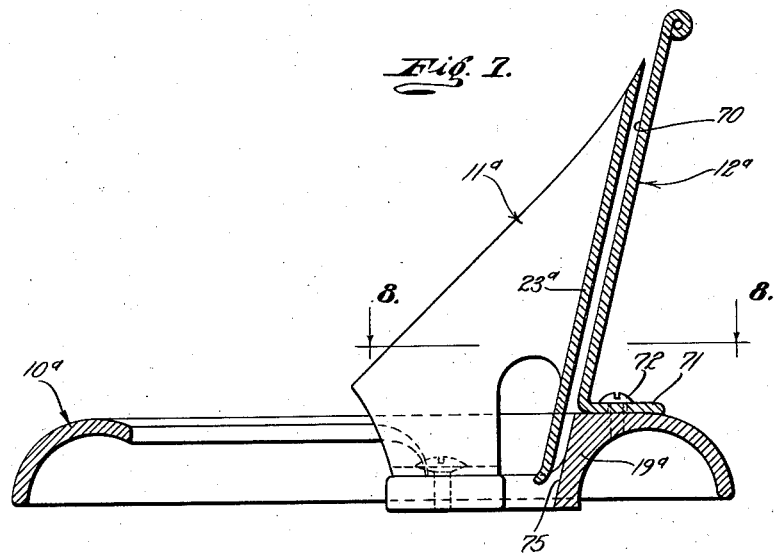
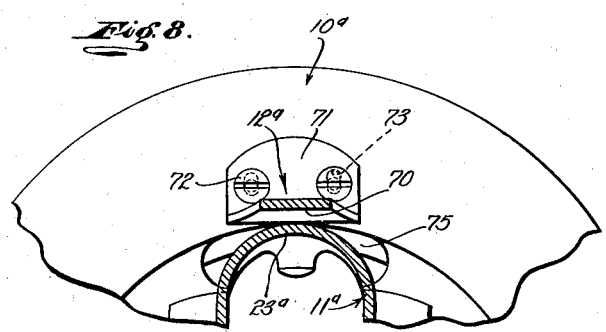
Inventor
Ozro N. Wiswell
By
His Attorney Patented Mar. 12, 1935

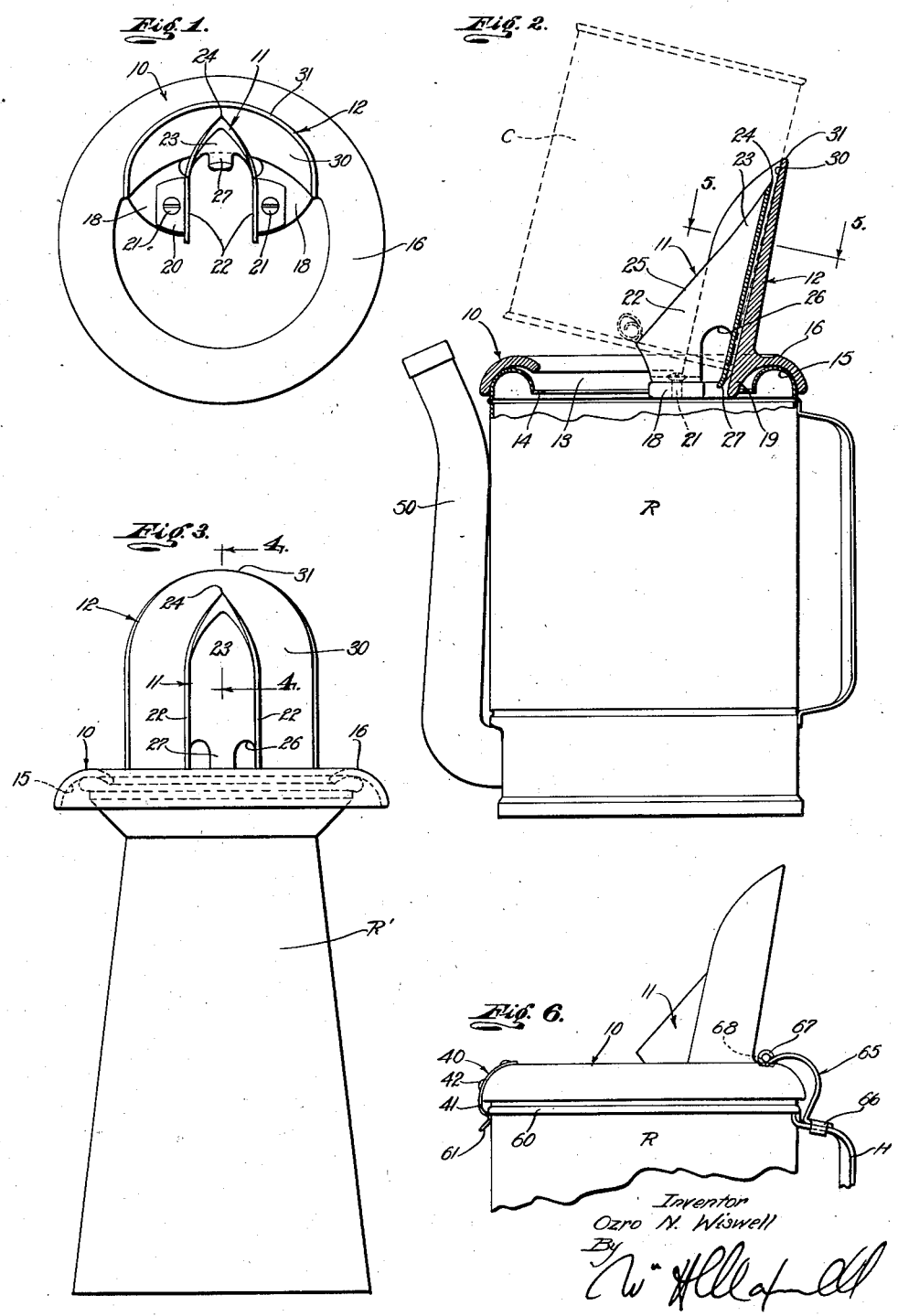

1,994,158

UNITED STATES PATENT OFFICE 1,994,158

DEVICE FOR OPENING SEALED CONTAINERS

Ozro N. Wiswell, Los Angeles, Calif., assignor to Swingspout Measure Company, Los Angeles, Calif., a corporation of California Application June 28, 1933, Serial No. 678,062

17 Claims. (Cl. 221—23)

This invention relates to a device for opening sealed containers and relates more particularly to a container opening device for use on dispensing and measuring receptacles. It is a general object of the present invention to provide a simple, practical and effective device for opening sealed containers that is adapted to be removably arranged on a receptacle for receiving the contents of the container or containers as they are opened.

Another object of the invention is to provide a device for opening sealed containers of motor oil, or the like, that comprises a cutter operable to cut an opening in the end of a container that is forced down upon it and a base carrying the cutter and adapted to be removably seated on the upper end of a liquid measure or dispensing receptacle for receiving the contents of the container as it is opened.

Another object of the invention is to provide a device of the character mentioned for opening sealed containers that will not be displaced from the receptacle on which it is seated during the opening of the container or containers.

Another object of the invention is to provide an effective container opening device including a base adapted to be removably positioned on the upper end of a receptacle and a cutter on the base that is inclined downwardly and inwardly toward the center of the receptacle so that the base is not displaced from the receptacle when a container is pushed on to the cutter to be opened thereby.

Another object of the invention is to provide a portable or removable device for opening sealed containers that is adapted to be placed on the upper end of a receptacle such as a measuring receptacle and does not interfere with the measuring function of the receptacle.

It is another object of the invention to provide a device of the character mentioned for opening sealed containers that may be used on liquid measuring receptacles and dispensing receptacles of various makes, shapes, etc.

Another object of the invention is to provide a device for opening sealed containers that includes a base adapted to be arranged on the upper end of a receptacle, an inclined cutter projecting upwardly from the base, and a guide on the base operable to guide containers on to the cutter that forms a shield for the cutter and prevents the user of the device from being injured on the cutter.

Another object of the invention is to provide a device of the character mentioned for opening sealed containers of lubricating oil, or the like, that permits the entire contents of a container to freely and quickly drain into the receptacle without soiling the exteriors of the receptacle and opened container.

A further object of the invention is to provide a device of the character mentioned for opening sealed containers that is simple and inexpensive of manufacture and that is safe, easy and convenient to handle and use.

Another object of the invention is to provide a container opening device having an improved cutter operable to make a large, clear opening in a sealed container.

Other objects and features of the invention will be best and fully understood from the following detailed description of typical forms and applications of the invention, throughout which description reference will be had to the accompanying drawings, in which:

Fig. 1 is a top or plan view of the device provided by the present invention. Fig. 2 is a vertical detailed sectional view of the opener illustrating it in operative position on the upper end of one form of dispensing receptacle. Fig. 3 is a front elevation of the device showing it mounted on the upper end of another type of receptacle. Fig. 4 is an enlarged fragmentary sectional view of the cutter taken as indicated by line 4—4 on Fig. 3. Fig. 5 is an enlarged fragmentary sectional view taken as indicated by line 5—5 on Fig. 2. Fig. 6 is a side elevation of another embodiment of the invention involving means for removably retaining the base on the receptacle. Fig. 7 is a vertical detailed sectional view of still another form of the invention, and Fig. 8 is a fragmentary transverse detailed sectional view taken as indicated by line 8—8 on Fig. 7.

The container opening device of the present invention may be varied considerably in proportions and design so as to be adapted for use on receptacles of different shapes and sizes, for example, the base of the device may be shaped and proportioned to fit on receptacles of unusual or special shapes or sizes. Throughout the following detailed disclosure I will describe two typical forms of the invention adapted to be used on the various common types of receptacles employed in the measuring and dispensing of lubricating oil, it being understood that the invention is not to be construed as limited or restricted to the specific forms and applications of the invention about to be described, but is to be taken as including any features or modifications that may fall within the scope of the claims.

The form of the present invention illustrated in Figs. 1, 2, 3, 4 and 5 of the drawings includes, generally, a base 10, adapted to be arranged on the upper end of a receptacle R, a cutter 11 on the base 10 operable to cut an opening in the end of a container C forced down upon it, and a guide 12 on the base 10 for guiding the container C on the cutter. The base 10 carries the cutter 11 and guide 12 and is shaped and designed to effectively seat or rest on the upper end of a measuring or dispensing receptacle, for instance, on the receptacle R. The base 10 is preferably annular in plan configuration to fit on the upper end 13 of the substantially cylindrical receptacle R. The receptacle R illustrated in the drawings has a rounded or inwardly turned upper end 13 and is provided with an internal flange 14 on the lower inner edge of the rounded top 13 to indicate the level to which the container is to be filled to measure a definite quantity of liquid. A continuous annular recess or groove 15 is provided in the lower side of the base 10 having grooved or concaved walls, as illustrated in Fig. 2 of the drawings, so that the base may properly engage the rounded upper end 13 of the receptacle R. The base 10 provided with the groove 15 in its under side is also operable to effectively seat or rest on the upper ends of receptacles of various shapes, for example, it may readily seat on the upper end of a receptacle R' of the character illustrated in Fig. 3 of the drawings. The groove 15 is of uniform shape and proportions throughout its length so that the base 10 is operable to evenly and firmly rest on the upper end of a receptacle. The base 10 may be shaped so that it extends or depends a substantial distance downwardly and outwardly over the upper end 13 of the receptacle but does not project any appreciable distance downwardly and inwardly into the mouth of the receptacle. In practice, the base 10 does not extend into the liquid measuring portion of the interior of the receptacle R. The upper end or surface 16 of the base 10 may be curved or made convex as illustrated throughout the drawings. In the particular form of the invention illustrated, the upper and lower surfaces 15 and 16 of the base 10 have adjacent centers of curvature. The inner and outer edges of the base 10 are preferably rounded and smooth. The base 10 formed as just described does not in any way interfere with a full view of the interior of the receptacle R or with the pouring or draining of liquid into the open upper end or mouth of the receptacle.

The cutter 11 is operable to cut a comparatively large opening in the lower end of the container C as the container is forced down upon it so that the contents of the container may freely discharge into the receptacle R. In accordance with the invention the cutter 11 is carried by the base 10 and projects upwardly and outwardly from the inner edge of the base. Spaced horizontal flanges 18 project inwardly from a dependent internal lip 19 of the base 10 to carry the cutter 11. The cutter 11 is substantially U-shaped in horizontal cross section and is positioned so that its open side faces inwardly. Outwardly or oppositely projecting ears 20 are provided on the lower ends of the side parts of the cutter 11 to seat on the spaced flanges 18. Screws or bolts 21 attach the ears 20 to the flanges 18. The spaced side parts 22 of the cutter are vertical and substantially parallel, while the outer portion 23 of the cutter which is of curved horizontal cross section, is inclined upwardly and outwardly as clearly illustrated in Fig. 2 of the drawings.

The cutter 11 projects a considerable distance upwardly from the base 10 and the upper edges of the side parts 22 are inclined upwardly and outwardly at a substantial angle to join in a point 24 at the upper end of the cutter. In accordance with the invention the upper ends or edges 25 of the side parts 22 are flat and at substantially right angles to the faces of the parts 22 and the point 24 is sharpened to readily pierce the end of a container C. In sharpening the pointed upper end of the cutter 11, the inner side of the part 23 is bevelled to the point 24. The point 24 is operable to pierce the end of the container C when the container is pushed down on the cutter and the outer edges of the flat upper ends 25 of the side parts 22 shear the material of the container as the downward movement of the container continues. The flat end faces 25 engage the portion of the container end outlined by the cut formed by the cutter to roll it upwardly in the manner illustrated in Fig. 2 of the drawings. The peculiar configuration of the cutter and the particular cutting action just described insures the cutting of a large clear opening in the end of the container C. As will be subsequently described, the point 24 of the cutter pierces the end of the container C immediately adjacent its periphery so that the cut formed by the cutter 11 extends inwardly from the lowest peripheral portion of the tipped container to provide for the complete draining of the contents of the container. Openings 26 extend upwardly from the lower end of the cutter 11 to permit the free draining of liquid from behind the cutter. The openings 26 are separated by a downwardly projecting tongue 27 having an inwardly curved lower end to prevent the bead on the lower end of the container C from becoming caught in the cutter.

The guide 12 is provided to guide containers on to the cutter 11 and to shield the cutter. The guide 12 projects upwardly from the base 10 adjacent the cutter 11 and is rigid with the base. In practice, the guide 12 may be integral with the base, in which case the base and guide may be in the nature of a one-piece casting. The embodiment of the invention being described is intended primarily to open containers of round or cylindrical cross section, and the guide 12 is shaped to effectively handle such containers. The guide 12 is of curved horizontal cross section having a concave inner face 30 for slidably guiding the containers on the cutter 11. The container guiding face 30 of the guide 12 is spaced a short distance outwardly from the outer face of the cutter 11 and is inclined upwardly and outwardly, being substantially parallel with the outer curved portion 23 of the cutter. The curved face 30 of the guide preferably has a comparatively large radius of curvature so as to be adapted to guide containers varying considerably in size. The guide 12 is preferably sufficiently large to project upwardly beyond the pointed upper end of the cutter and circumferentially outward beyond the opposite ends of the cutter. The upper end 31 of the guide 30 is preferably rounded as clearly illustrated in Fig. 3 of the drawings. It will be apparent how the guide 12 is operable to slidably guide the container C downwardly on to the cutter 11 so that the point 24 of the cutter pierces the end of the container adjacent its periphery and the cutter forms an opening in the end of the container extending inwardly from its peripheral edge.

It is believed that the utility and practicability of the form of the invention illustrated in Figs. 1 to 5 inclusive of the drawings will be readily apparent from the foregoing detailed description. When it is desired to open a sealed container C and to dispense its contents, the base 10 of the device is seated on the upper end 13 of the receptacle and the container C is pushed downwardly on the cutter 11. The guide 12 guides the container so that the point 24 of the cutter pierces the end of the container at its peripheral edge and the guide 12 continues to guide the container in a tilted or inclined position as it is forced downwardly on the cutter 11. The inclined shearing edges 25 of the cutter operate to make an increasingly larger opening in the end of the container as the container is moved downwardly on the cutting edge, and in being blunt or flat, cause the material within the cut to be rolled upwardly and inwardly leaving a free opening in the end of the container. The contents of the container are free to entirely drain through the opening thus formed and pass downwardly between the spaced parts of the cutter and the spaced parts of the cutter and the spaced flanges 18 into the receptacle R. Any of the contents that may flow behind the cutter are free to drain through the openings 26. As the container C is in a tipped or inclined position when opened, its contents quickly and entirely drain out through the opening formed by the cutter 11.

The force exerted on the container C to open it on the cutter 11 is directed downwardly and inwardly toward the center of the receptacle R, the guide 12 and cutter 11 acting to guide the container in this direction during the opening operation. This downwardly and inwardly directed force does not tend to shift or displace the base 10 from the upper end of the receptacle and does not cause the opening device or receptacle to tip. After the liquid has drained from the container C into the receptacle R, the container and base 10 may be removed from the receptacle and the liquid dispensed through the swingable spout 50, or if desired, the base 10 carrying the container C may be left on the receptacle during the dispensing of the liquid. When the base is removed from the receptacle the container may be left on the cutter and the base inverted so that any liquid that may be clinging to the base or cutter may drain back into the container. As the opening device and container C do not extend into the interior of the receptacle R they do not interfere with the measuring function of the receptacle and do not become soiled by the liquid. The liquid discharging or draining from the opening in the end of the container C formed by the cutter 11 does not soil the exteriors of the receptacle R or container C and merely wets only small portions of the cutter and flanges 18. The container opening device of the present invention is not rigidly or permanently connected with the dispensing or measuring receptacle and may normally be removed from the receptacle leaving it free to be used in the handling of liquids that are not held in sealed containers. The device is always available and may be quickly seated on the receptacle when it is desired to open a sealed container and dispense its contents. The container opening device does not in any way injure or mar the receptacle and may be constructed so that it may be used on receptacles of various classes. The device of the present invention is inexpensive of manufacture, and is safe and convenient to use.

Fig. 6 of the drawings illustrates a form and application of the invention in which one or more clips or holding devices 40 are provided on the base 10 to releasably hold the base on the upper end of the receptacle. The releasable holding or connecting devices 40 are in the nature of spring clips each including a curved flexible member 41 adapted to extend downwardly from the base 10 to engage the bead 60 at the lower outer edge of the receptacle top 13. The flexible members 41 may be suitably attached to the base 10 as at 42. The active lower ends 61 of the clip members 41 may be bowed or bent inwardly to effectively engage under the bead 60. It will be apparent how the base 10 may be readily seated on the upper end 13 of the receptacle and how spring members 41 spring over the bead 60 to have their lower portions engage under the bead in a manner so that the members 41 yieldingly urge the base downwardly on the receptacle. The clip members 41 may be easily disengaged from the bead 60 and the base 10 removed from the upper end of the receptacle by merely lifting the base free of the receptacle. The holding means 40 is operable to dependably retain the container opening device on the upper end of the receptacle when the receptacle is being handled and shifted.

If desirable or found necessary, a clip 65 may be provided on the receptacle R for cooperating with the base 10 to releasably hold the base on the upper end of the receptacle. Where one holding device 40 is provided on the base 10, it is preferably positioned at a point diametrically opposite the cutter 11. The clip 65 is attached to the upper end portion of the handle H of the receptacle and is adapted to engage the upper side of the base 10 to urge the base downwardly on the upper end of the receptacle. The clip 65 may be suitably attached to the handle H as at 66. In accordance with the invention, the clip 65 is flexible and resilient and curves upwardly so as to fit over the outer portion of the base 10. A rolled part 67 is provided on the upper end of the clip 65 to cooperate with a recess or depression 68 in the upper side of the base 10 at the lower end of the guide 12. It will be apparent how the base 10 may be slipped under the projecting portion of the clip 65 so that the rolled end 67 seats in the depression 68 to urge the base on to the receptacle. The holding device 40 may then be snapped downwardly over the rim or bead 60 to aid in retaining the base on the receptacle.

The form of the invention illustrated in Figs. 7 and 8 of the drawings includes, generally, a base 10ª adapted to be positioned on the upper end of the measuring or dispensing receptacle, a cutter 11ª carried by the base, and a guide 12ª for guiding containers on to the cutter to be opened thereby.

The base 10ª and the cutter 11ª may be identical with the base 10 and cutter 11 described above. The guide 12ª is attached to the upper side of the base 10ª at a point outwardly of the cutter 11ª. The guide 12ª is a comparatively narrow elongate member having a flat or substantially flat inner side 70 for guiding the containers on the cutter. A base flange or attaching flange 71 is provided on the lower end of the guide 12ª and seats on the upper side of the base 10ª. The surface of the base 10ª supporting the flange 71 may be flat. In accordance with the invention, the guiding surface 70 of the guide is spaced from and substantially parallel with the outer surface of the cutter portion 23ᵃ. The guide 12ᵃ is attached to the base 10ᵃ so that it may be adjusted relative to the cutter. Screws 72 pass through openings 71 in the flange 71 and thread into the base 10ᵃ to attach the guide to the base. The openings 73 are elongated so that the guide 12 may be adjusted toward and away from the cutter when the screws 72 are loosened. The longitudinal edges of the guide 12ᵃ may converge upwardly somewhat and the upper end of the guide may be rolled. The inner surface 75 of the base lip 19ᵃ is preferably spaced from and substantially parallel with the inclined plane tangential to the outer surface of the curved portion 23ᵃ of the cutter and parallel to the surface 70 of the guide.

The operation of the form of the invention illustrated in Figs. 7 and 8 of the drawings is the same as the operation of the other forms of the invention. The guide 70, in being adjustable relative to the cutter and in having a flat comparatively narrow guiding surface adapts the device for opening containers of various configurations, for example, containers having flat sides. The device may be embodied in forms for opening large or comparatively large containers of various configurations.

Having described only typical forms and applications of my invention, I do not wish to be limited or restricted to the specific forms and applications herein set forth, but wish to reserve to myself any modifications or variations that may appear to those skilled in the art or fall within the scope of the following claims.

Having described my invention, I claim:

1. A container opening device for use on an open topped receptacle including, a base adopted to be removably seated on the upper end of the receptacle, the base having a relieved lower side to receive the upper end portion of the receptacle and to have bearing engagement with the receptacle along the major portion of its upper end, and a cutter projecting upwardly from the base for cutting an opening in a container forced onto it.

2. A container opening device for use on an open topped receptacle including, a base having a downwardly facing lower side to be removably seated on an upwardly facing surface of the receptacle, and a cutter projecting upwardly from the base for cutting an opening in a container pushed upon it, the base having bearing engagement with the receptacle at points remote from the cutter.

3. A container opening device for use on an open topped receptacle including, a base having a downwardly facing lower side to seat on an upwardly facing surface of the receptacle, a cutter projecting from the base adapted to cut an opening in containers forced on it, and a guide on the base for guiding the container onto the cutter, the base having bearing engagement with the said surface of the receptacle at a point across the upper end of the receptacle from the cutter.

4. A container opening device for use on an open topped receptacle including, an annular base having a downwardly facing lower surface to removably seat on an upwardly facing surface of a receptacle, a cutter projecting from the base adapted to cut an opening in a container forced onto it, the cutter being inclined with respect to said surface of the base so that the force acting on the cutter during the opening of the container is directed downwardly and inwardly toward the center of the receptacle, and means for guiding the container on the cutter.

5. A container opening device for use on an open topped receptacle including, a base adapted to be removably positioned on the upper end of the receptacle, and a cutter supported by the base within the confines of the upper portion of the receptacle and projecting therefrom to cut an opening in a container pushed onto it and pitched so that the force acting on the cutter is directed downwardly and inwardly toward the center of the receptacle, the base having bearing engagement with the receptacle at points remote from the cutter.

6. A container opening device for use on an open topped receptacle including, a base adapted to be removably seated on the upper end of the receptacle, there being a groove in the lower side of the base to receive the upper end of the receptacle, and an upwardly projecting cutter on the base operable to cut an opening in a container forced upon it, the base engaging the upper end of the receptacle throughout the major portion of its extent.

7. A container opening device for use on an open topped receptacle including, an annular base adapted to be removably seated on the upper end of a receptacle, there being a groove in the lower side of the base for receiving the upper edge portion of the receptacle, and an upwardly and outwardly inclined cutter on the base operable to cut an opening in a container pushed onto it.

8. A container opening device for use on an open topped receptacle including, an annular base adapted to be removably seated on the upper end of a receptacle, a part disposed in a plane below said end of receptacle and projecting inwardly from the base, and a cutter supported by said part and projecting upwardly from the base.

9. A container opening device for use on an open topped receptacle including an annular base adapted to be removably seated on the upper end of a receptacle, spaced flanges projecting inwardly from the base and disposed in a plane below said end of the receptacle, and a cutter supported by the flanges and projecting upwardly from the base, the cutter being substantially U-shaped in horizontal cross section with its open side facing inwardly.

10. A container opening device for use on an open topped receptacle including, an annular base adapted to be removably seated on the upper end of a receptacle, a part projecting inwardly from the base and disposed in a plane below said end of the receptacle, and a cutter supported by the said part and projecting upwardly and outwardly from the base.

11. A container opening device for use on an open topped receptacle including, an annular base adapted to be removably seated on the upper end of a receptacle, spaced flanges projecting inwardly from the inner edge of the base, and an upwardly projecting cutter substantially U-shaped in horizontal cross section supported by the flanges and having the space between its side parts aligned with the space between the flanges.

12. A container opening device for use on a receptacle including, a base adapted to be removably positioned on the upper end of the receptacle, a cutter projecting from the base and adapted to cut an opening in a container forced downwardly on it, a guide projecting from the base and having a container guiding surface spaced outwardly from and substantially parallel with the outer face of the cutter, and means attaching the guide to the base for adjustment relative to the cutter.

13. In combination, an open topped liquid measuring receptacle, and a container opening device including a base having a downwardly facing lower side to removably seat on an upwardly facing surface of the receptacle, and a cutter projecting from the base operable to cut an opening in a container pushed down upon it, the base having engagement with the receptacle at points remote from the cutter.

14. In a device for opening sealed containers, a projecting cutter operable to cut an opening in a container forced upon it, the cutter being substantially U-shaped in transverse cross section comprising an outer portion having a sharpened point at its upper end for piercing the container and spaced side parts having substantially flat inclined upper edges in a common plane and substantially normal to the adjacent side surfaces of the side parts.

15. A device for opening sealed containers including, a base, and a cutter projecting upwardly from the base operable to cut an opening in a container forced down on it, the cutter being substantially U-shaped in horizontal cross section comprising spaced side parts and a connecting part joining the side parts, the connecting part having a sharpened point at its upper end for piercing the container and the side parts having substantially flat upper edges in a common plane inclined downwardly from the point and substantially normal to the adjacent side surfaces of the side parts to shear the material of the container and to roll the portion of the container between the side parts of the cutter upwardly and away from the cutter.

16. A container opening device for use on an open topped receptacle including, a base adapted to be removably seated on the upper end of the receptacle, a projecting cutter on the base operable to cut an opening in a container pushed down on it, and a spring clip on the base operable to cooperate with a part of the receptacle to releasably hold the base on the receptacle.

17. A device for opening cans and adapted for use on an open topped receptacle, said device including an annular base having a downwardly facing surface adapted to removably seat on the upwardly facing end of the receptacle and shaped to cooperate therewith to prevent lateral movement of the base, and a cutter projecting from the base for cutting an opening in a can.

OZRO N. WISWELL.